(No Model.)
J. L. COBURN.
HORSE BLANKET.
No. 409,392. Patented Aug. 20, 1889.
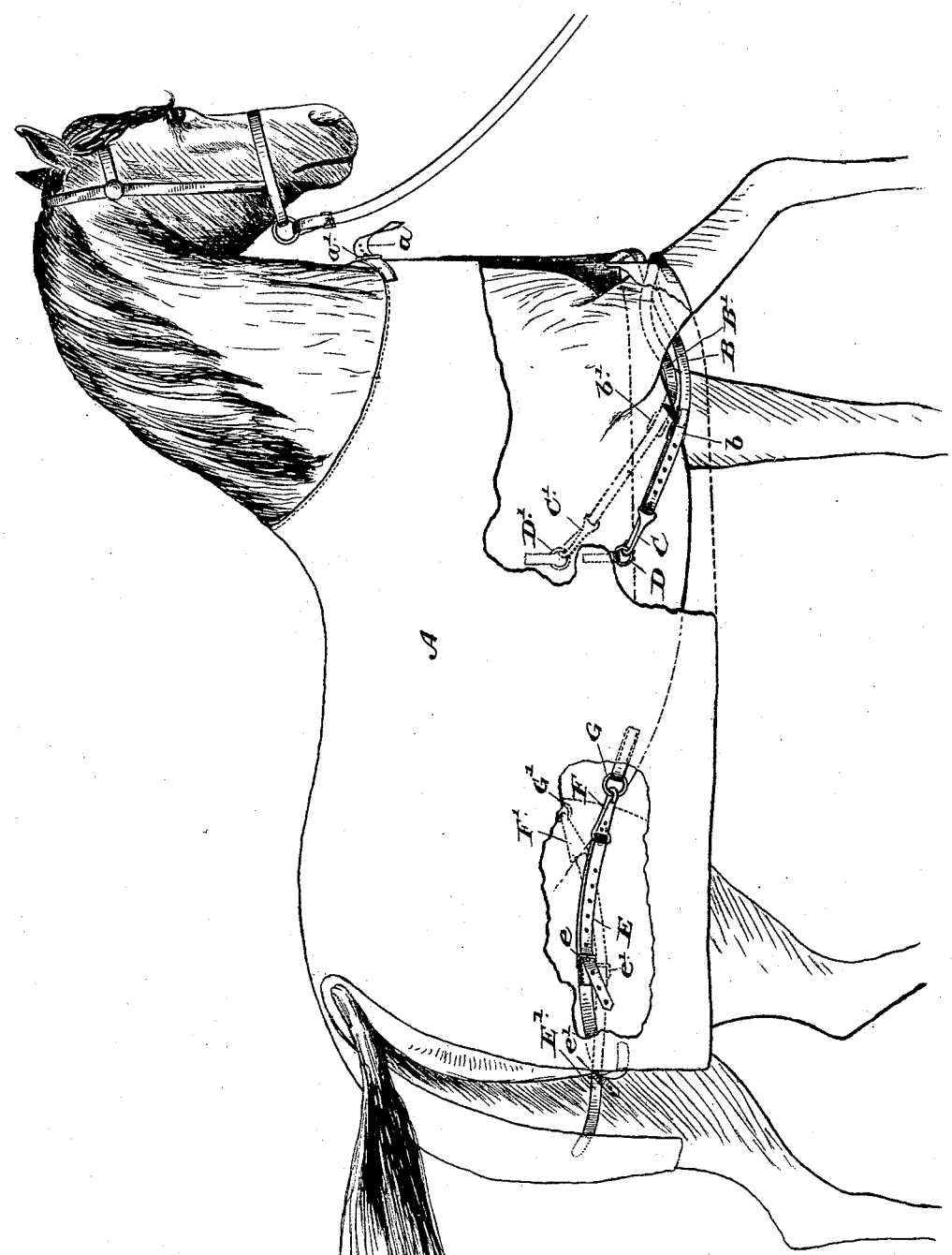
Witnesses.
F. B. Fetherstonhaugh
Charles H. Riches.
Inventor
Jas. L. Coburn
by Donald C. Ridout & Co
Attys

UNITED STATES PATENT OFFICE.

JOSEPH L. COBURN, OF NEWMARKET, ONTARIO, ASSIGNOR TO NAOMI COBURN AND ELIZABETH JANE MARTIN, OF TORONTO, CANADA.

HORSE-BLANKET.

SPECIFICATION forming part of Letters Patent No. 409,392, dated August 20, 1889.

Application filed December 1, 1888. Serial No. 292,371. (No model.)

*To all whom it may concern:*

Be it known that I, JOSEPH LINDSAY COBURN, agent, of the town of Newmarket, in the county of York, in the Province of Ontario, Canada, have invented a certain new and useful Horse-Blanket Fastener, of which the following is a specification.

The object of the invention is to provide a secure and effective way of fastening a blanket on a horse or other quadruped, thus dispensing with a surcingle and crupper, rendering it impossible for the animal to displace the blanket when rolling or lying down to rest; and it consists, essentially, of an ordinary blanket with the ordinary breast-strap and buckle, and two straps fastened one at each of the front corners of the blanket, and supplied with a running buckle for the purpose of adjusting the length of same, and a snap attached to each strap designed to fasten onto rings attached to the inner sides of the blanket immediately behind each of the fore legs of the animal. These straps, proceeding from the front corners of the blanket, cross each other under the breast of the horse, so that one side of the blanket is connected with the opposite side thereof, when the blanket is secured on the horse. There are also two other straps with running buckles and snaps, similar to the front straps already referred to, fastened to the blanket near the rear corners thereof, the free ends being provided with snaps and adapted when snapped onto rings attached to the inner side of the blanket immediately in front of the thigh of the animal to embrace the inner part of the thigh of the animal. These rear straps do not cross each other, as is the case with the front straps, but snap onto rings attached to the blanket, as mentioned, on the same side as the strap. Instead of rings and snaps, there may be an equivalent method of fastening by means of hooks and eyes attached to the straps and blanket, respectively.

The figure represents a horse with blanket fastened thereon by my fastener, parts of the blanket and horse being broken away to illustrate the device.

In this figure, A is the blanket; $a$, the usual breast-strap, and $a'$ the buckle.

B B' represent the front straps attached at each of the front corners of the blanket, and are crossed, as shown, under the breast of the horse.

$b\ b'$ are running buckles to lengthen or shorten the straps, as desired; and C C' are snaps on the straps B B'.

D D' are the forward rings fastened to the inner side of the blanket just behind the upper part of the fore legs of the animal. It will be noticed that the strap B crosses diagonally under the breast of the horse, and is fastened to the ring D' on the opposite side of the blanket, and in the same way strap B' crosses diagonally, and is fastened to the ring D.

E E' are the rear straps, similar to the front straps, with running buckles $e\ e'$ and snaps F F'. These straps are designed to embrace the inner side of the thigh of the horse and to snap onto rear rings G G', fastened to the inner sides of the blanket immediately in front of the thighs of the horse. These straps do not cross, but strap E is fastened to ring G on the same side and strap E' to ring G', also on the same side, when the blanket is fastened on the animal.

This method of fastening a blanket on an animal can be done with great ease and rapidity, and is specially adapted for animals which are much exposed to cold weather, as it is impossible for the animal to displace the blanket when rolling or lying down.

What I claim as my invention is—

1. The combination, with a blanket A, of front straps B B', running buckles $b\ b'$, snaps C C', rings D D', rear straps E E', running buckles $e\ e'$, snaps F F', and rings G G', substantially as described, and for the purpose specified.

2. The combination, with a blanket A, of adjustable straps B B' and adjustable straps E E', designed to fasten onto rings or catches D D', the snaps on said straps, and rings or catches G G', substantially as described, and for the purpose specified.

Newmarket, November 16, 1888.

JOSEPH L. COBURN.

In presence of—
    JOHN H. MILLARD,
    JOSEPH MILLARD.